United States Patent
Ko et al.

(10) Patent No.: US 9,037,279 B2
(45) Date of Patent: May 19, 2015

(54) CLUSTERING FOR PREDICTION MODELS IN PROCESS CONTROL AND FOR OPTIMAL DISPATCHING

(75) Inventors: Francis Ko, Taichung (TW); Tzu-yu Wang, Taipei (TW); Kewei Zuo, Yonghe (TW); Henry Lo, Hsin-Chu (TW); Jean Wang, Hsin-Chu (TW); Chih-Wei Lai, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1351 days.

(21) Appl. No.: 12/831,597

(22) Filed: Jul. 7, 2010

(65) Prior Publication Data
US 2011/0060441 A1    Mar. 10, 2011

Related U.S. Application Data

(60) Provisional application No. 61/240,743, filed on Sep. 9, 2009.

(51) Int. Cl.
G06F 19/00 (2011.01)
H01L 21/00 (2006.01)
G05B 17/02 (2006.01)

(52) U.S. Cl.
CPC ..................... *G05B 17/02* (2013.01)

(58) Field of Classification Search
USPC ........... 700/28, 29, 32, 100, 121, 96, 99, 108, 700/116; 702/82; 438/5
See application file for complete search history.

(56) References Cited

U.S. PATENT DOCUMENTS

| | | | | |
|---|---|---|---|---|
| 5,586,021 A * | 12/1996 | Fargher et al. | ................ | 700/100 |
| 5,914,879 A * | 6/1999 | Wang et al. | .................. | 700/111 |
| 6,470,231 B1 * | 10/2002 | Yang et al. | .................... | 700/121 |
| 6,941,183 B1 * | 9/2005 | Huang et al. | ................. | 700/101 |
| 7,031,860 B2 * | 4/2006 | Liang et al. | ..................... | 702/84 |
| 7,197,414 B2 * | 3/2007 | Matsushita et al. | ............ | 702/83 |
| 7,415,316 B2 * | 8/2008 | Quarg | .......................... | 700/100 |
| 7,502,658 B1 * | 3/2009 | Barbee et al. | ................. | 700/109 |
| 7,546,177 B2 * | 6/2009 | Dierks et al. | ................. | 700/121 |
| 7,650,199 B1 * | 1/2010 | Kadosh | ......................... | 700/121 |
| 7,937,234 B2 * | 5/2011 | St. Pierre et al. | ............... | 702/81 |
| 8,095,230 B2 * | 1/2012 | Ouyang et al. | .................. | 700/99 |
| 8,229,587 B2 * | 7/2012 | Shieh et al. | .................... | 700/112 |
| 8,295,965 B2 * | 10/2012 | Wu et al. | ........................ | 700/102 |
| 8,369,976 B2 * | 2/2013 | Wong et al. | ................... | 700/112 |

(Continued)

Primary Examiner — Ronald Hartman, Jr.
(74) Attorney, Agent, or Firm — Slater & Matsil, L.L.P.

(57) ABSTRACT

A first embodiment is a method for semiconductor process control comprising clustering processing tools of a processing stage into a tool cluster based on processing data and forming a prediction model for processing a semiconductor wafer based on the tool cluster. A second embodiment is a method for semiconductor process control comprising providing cluster routes between first stage tool clusters and second stage tool clusters, assigning a comparative optimization ranking to each cluster route, and scheduling processing of wafers. The comparative optimization ranking identifies comparatively which cluster routes provide for high wafer processing uniformity. Further, wafers that require high wafer processing uniformity are scheduled to be processed along one cluster route that has a high comparative optimization ranking that identifies the one cluster route to have a highest wafer processing uniformity, and wafers that do not require high wafer processing uniformity are scheduled to be processed along another cluster route.

20 Claims, 7 Drawing Sheets

(56) References Cited

U.S. PATENT DOCUMENTS

| | | | |
|---|---|---|---|
| 8,412,368 B2* | 4/2013 | Adhikari et al. | 700/100 |
| 2002/0132479 A1* | 9/2002 | Coumou | 438/689 |
| 2005/0234578 A1* | 10/2005 | Liu et al. | 700/100 |
| 2008/0275586 A1* | 11/2008 | Ko et al. | 700/110 |
| 2009/0248189 A1* | 10/2009 | Schmidt et al. | 700/109 |
| 2009/0317924 A1* | 12/2009 | Ouyang et al. | 438/5 |

* cited by examiner

CLUSTERING FOR PREDICTION MODELS IN PROCESS CONTROL AND FOR OPTIMAL DISPATCHING

This application claims the benefit of U.S. Provisional Application No. 61/240,743, filed on Sep. 9, 2009, entitled "Clustering for Prediction Models in Process Control and for Optimal Dispatching," which application is hereby incorporated herein by reference.

TECHNICAL FIELD

The present invention relates generally to semiconductor processing and, more particularly, to a clustering method for building a prediction model in process control and a method for optimal dispatching.

BACKGROUND

Generally, in semiconductor processing, multiple tools are used to process multiple wafers at each processing step. Once each processing step is completed for each wafer, the wafer then is typically dispatched randomly to one of multiple tools for processing at the next processing stage. FIG. 1 illustrates a simplified example of this random dispatching. Initially, wafers 2 are dispatched to one of the first stage processing tools 10, 12, 14, or 16. After the first stage processing is complete, the wafers 2 are then randomly dispatched to one of the second stage processing tools 20, 22, 24, 26, 28, or 30. Further, after the second stage processing is complete, the wafers 2 again are randomly dispatched to one of the third stage processing tools 40, 42, or 44.

These multiple tools and multiple random paths conventionally require the implementation of a large number of complex models used for virtual metrology. Each tool or chamber must be considered separately as a single model. Accordingly, the models are difficult to maintain and adapt. Further, a new model generally must be created every time a new tool is employed. Also, virtual wafer acceptance testing (VWAT) realization is difficult, if not impossible, because of the multiple sequences of tool combinations. For example, in the simplified example of FIG. 1, to realize VWAT, seventy-two models would have to be created and maintained (4×6×3=72). However, in real world manufacturing, the necessary number of models would number in the thousands because there are generally many more stages and processing tools per each stage.

Further, with the random dispatching, prediction results are typically poor because a model for each route of processing would be built on a small amount of lots. Without a larger dataset from more lots, obtaining a precise prediction model is generally very difficult to achieve. Accordingly, there is a need in the art to overcome or obviate these stated deficiencies.

SUMMARY OF THE INVENTION

These and other problems are generally solved or circumvented, and technical advantages are generally achieved, by embodiments of the present invention which may reduce the number of prediction models used for process control by clustering tools within a processing stage and may optimize wafer uniformity by scheduling wafer processing along routes that allow for the highest uniformity.

In accordance with an embodiment of the present invention, a method for semiconductor process control comprises clustering processing tools of a processing stage into a tool cluster based on processing data and forming a prediction model for processing a semiconductor wafer based on the tool cluster.

In accordance with another embodiment of the present invention, a method for semiconductor process control comprises providing cluster routes between first stage tool clusters and second stage tool clusters, assigning a comparative optimization ranking to each cluster route, and scheduling processing of wafers. Each cluster route is between one first stage tool cluster and one second stage tool cluster. The comparative optimization ranking identifies comparatively which cluster routes provide for high wafer processing uniformity. Wafers that require high wafer processing uniformity are scheduled to be processed along one cluster route that has a high comparative optimization ranking that identifies the one cluster route to have a highest wafer processing uniformity, and wafers that do not require high wafer processing uniformity are scheduled to be processed along another cluster route.

In accordance with another embodiment of the present invention, a system for semiconductor wafer processing comprises first and second stage processing tools, a clustering tool, and a scheduling tool. The clustering tool clusters the first stage processing tools into first stage tool clusters and clusters the second stage processing tools into second stage tool clusters. The scheduling tool schedules wafer processing along cluster routes between the first stage tool clusters and the second stage tool clusters. Each cluster route is between one first stage tool cluster and one second stage tool cluster

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the present embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely a method to cluster processing tools in building prediction models for process control or in determining optimal cluster routes. The invention may be applied wherever prediction models are utilized.

A first embodiment clusters tools at each stage into groups, or tool clusters. The clustering may be accomplished by using a number of algorithms, including a k-mean algorithm, an analysis of variance (ANOVA) process, a top-down and bottom-up tree methodology, and a c-clustering algorithm. These algorithms may use many different parameters in clustering the tools at each stage, such as realtime sensor values of each tool like Fault Detection and Classification (FDC), inline data like in situ metrology results, the tool identification (ID), and wafer acceptance testing (WAT) results like drive current uniformity (IdU), threshold voltage uniformity (VtU), and copper resistance uniformity (RsU).

Figure 1:
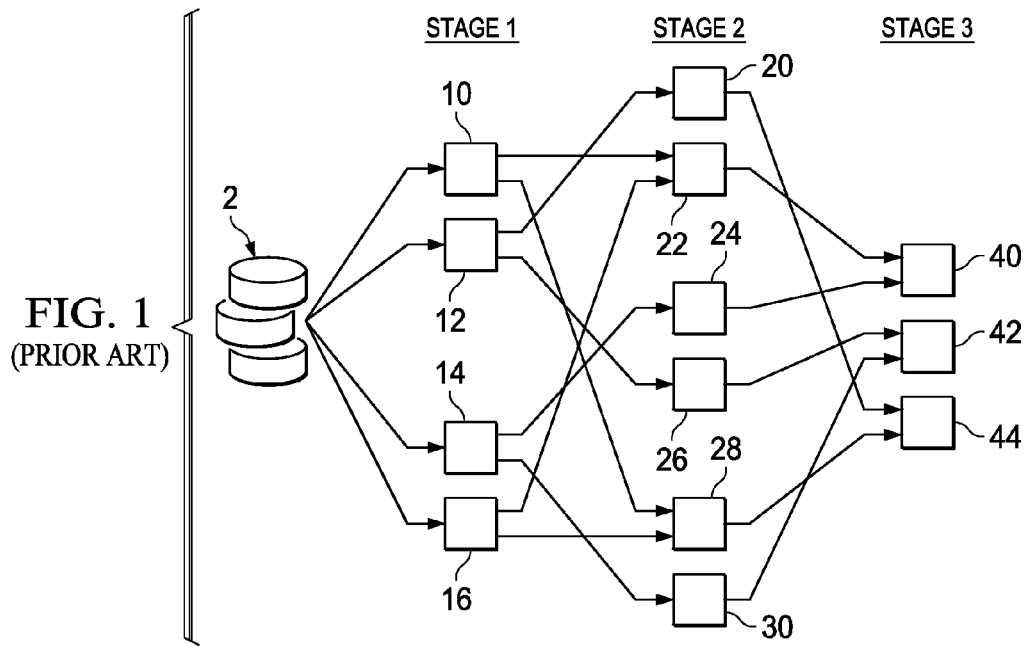
FIG. 1 is a simplified example of random dispatching of semiconductor wafers for processing.
Figure 2:
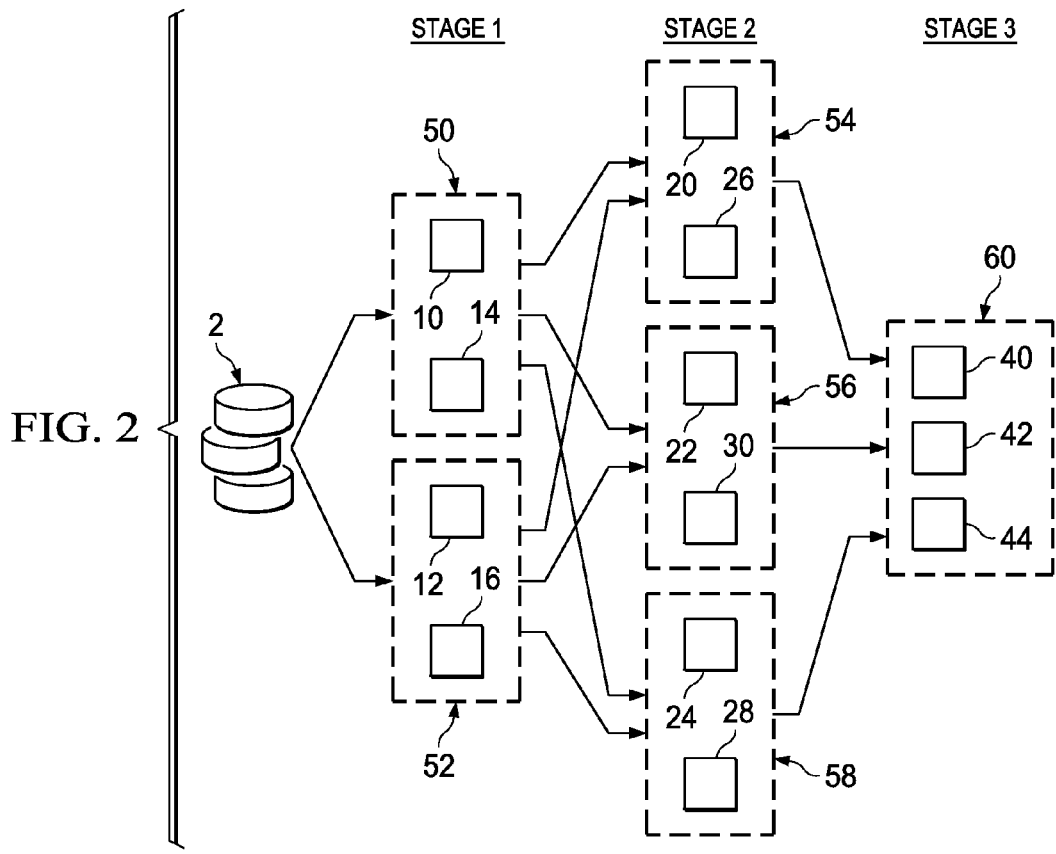
FIG. 2 is an exemplary processing system with tool clusters at respective processing stages in accordance with an embodiment of the present invention.

FIG. 2 represents an embodiment after the tools are clustered. First stage processing tools 10 and 14 comprise tool cluster 50, and first stage processing tools 12 and 16 form tool cluster 52. Tool cluster 54 comprises second stage processing tools 20 and 26, tool cluster 56 comprises second stage processing tools 22 and 30, and tool cluster 58 comprises second stage processing tools 24 and 28. Tool cluster 60 comprises the third stage tools 40, 42, and 44.

Figure 3A:
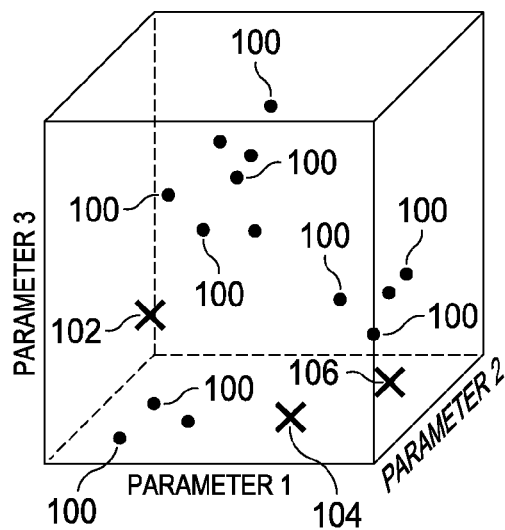
FIGS. 3A through 3C represent the functionality of a k-mean algorithm clustering processing tools in accordance with an embodiment of the present invention.
Figure 3B:
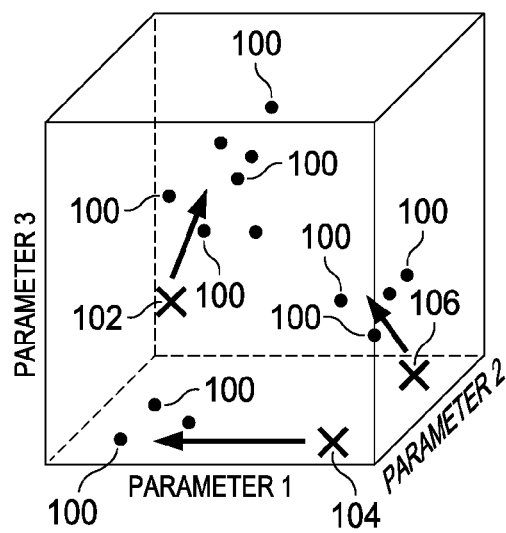
Figure 3C:
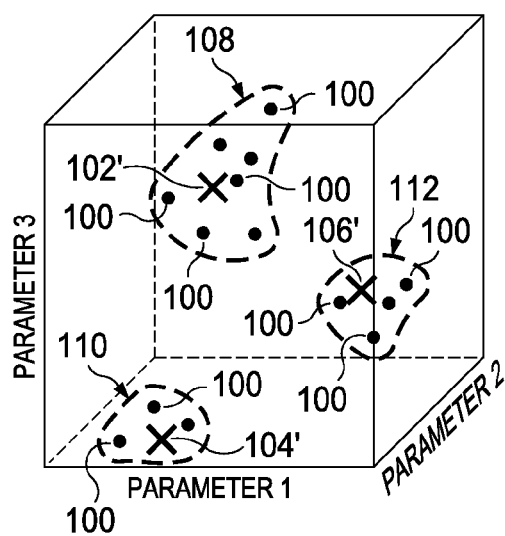

FIGS. 3A through 3C represent the functionality of a k-mean algorithm clustering the second stage tools of FIG. 2. First, an arbitrary number of centroids are introduced as points in an n-dimensional space, where n is the number of parameters used in the clustering algorithm. In FIG. 3A, three centroids 102, 104, and 106 are introduced into a three-dimensional space. Data sets of parameters are represented by respective points 100 in the three-dimensional space. In FIG. 3B, the points 100 are then grouped to the nearest centroid 102, 104, or 106. The k-mean algorithm will then run some number of iterations causing the centroids 102', 104', and 106' to converge to a steady state with respect to each respective group 108, 110, and 112, as shown in FIG. 3C. Once the centroids 102', 104', and 106' converge to a steady state, each group 108, 110, and 112 represented by each centroid 102', 104', and 106' represents a tool cluster.

Figure 4A:
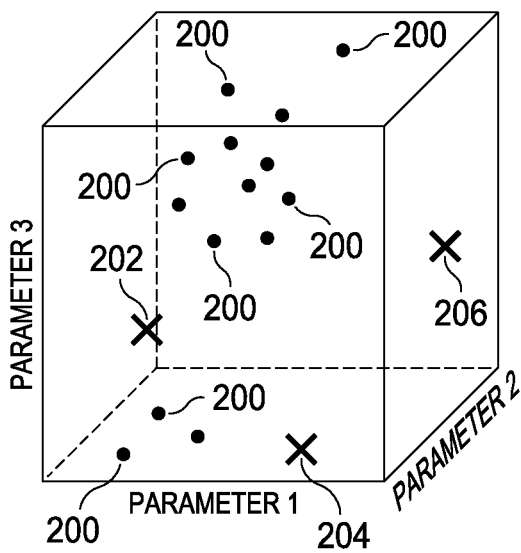
FIGS. 4A through 4F represent the functionality of a k-mean algorithm where a variable number of centroids approach is used to cluster processing tools in accordance with an embodiment of the present invention.
Figure 4B:
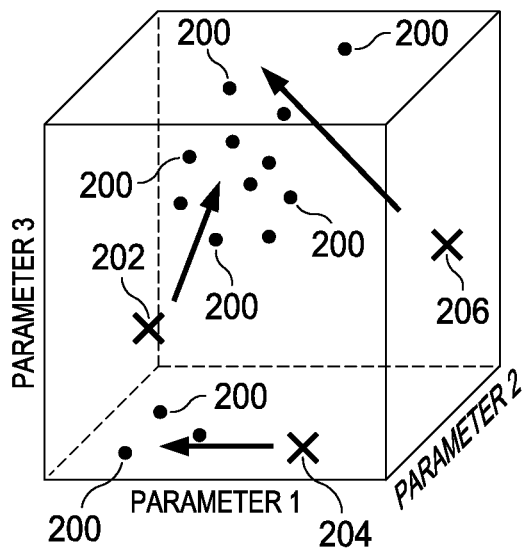
Figure 4C:
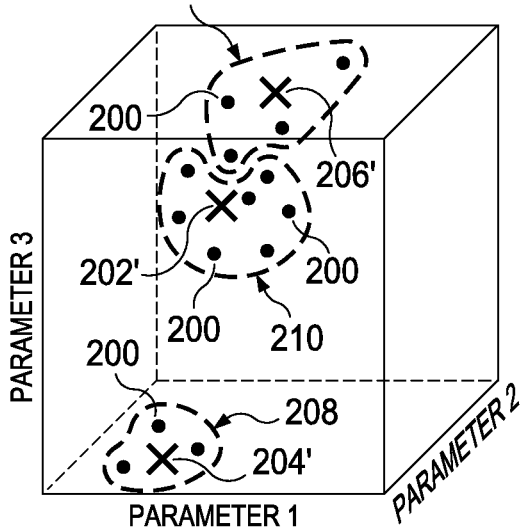

The number of centroids introduced into the n-dimensional space may be a fixed number or may be variable. FIGS. 4A through 4F illustrate an embodiment where a variable number of centroids approach is used with a k-mean algorithm to illustrate the clustering of the first stage tools of FIG. 2, and one centroid is eliminated. First, some arbitrary number of centroids may be introduced into the n-dimensional space, and the k-mean algorithm may be run. In FIG. 4A, three centroids 202, 204, and 206 are introduced into a three-dimensional space containing data set points 200. FIG. 4B shows the centroids 202, 204, and 206 converging to a steady state by running the k-mean algorithm.

Figure 4D:
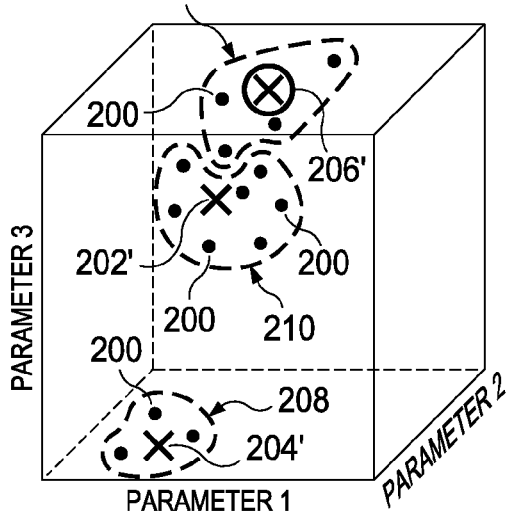
Figure 4E:
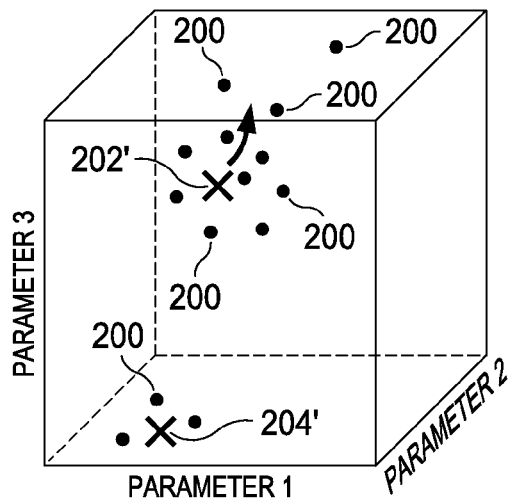
Figure 4F:
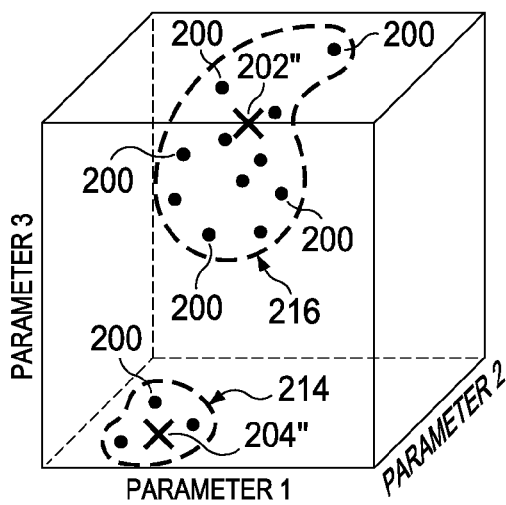

Once the algorithm causes the centroids 202', 204', and 206' to converge to a steady state and form respective groups 208, 210, and 212, the error rates or variance of the groups 208, 210, and 212 with regard to the centroids 202', 204', and 206' may be analyzed. If the error rates are acceptable, the process is completed. However, if the initial error rate is very low, one or more centroids, such as the centroid 206' in this example, may be removed as shown in FIG. 4D, and the process ran again as shown in FIG. 4E. This also can continue until the error rate is within an acceptable range. At completion as shown in FIG. 4F, groups 214 and 216 with respective centroids 204'' and 202'' are formed with acceptable error rates. Further, if the error rate is too high, another centroid may be added, and the process ran again until the centroids converge to steady state. This can continue until the error rate is within an acceptable range.

Alternatively, the tools may be clustered by tool performance, such as by IdU, by using an analysis of variance (ANOVA). If the ANOVA results in a p-value less than 0.05, the tools are clustered. The ANOVA process is well known in the art and is herein omitted. The ANOVA process may use variation of results from WAT, such as IdU and VtU, and/or tool IDs to determine whether tools should be clustered together. Also, inline data from processing, such as in situ metrology results, may be used in this clustering. Using this data, an ANOVA process may be used to determine the performance variation within the tools to determine which tools should be clustered. Other methodologies may be used to cluster the tools, such as the k-mean algorithm, the top-down and bottom-up tree methodology, and the c-clustering algorithm. These algorithms may use many other parameters in clustering the tools at each stage, such as realtime sensor values, tool ID, and WAT results. Again, the number of tool clusters may be fixed or variable.

After any clustering, fewer prediction models may be formed to be used in processing control, particularly in adaptive virtual metrology, although other processing techniques are not excluded. With a fixed number of clusters, a fixed number of models will be built. However, with a variable number of clusters, the number of models will change depending on the circumstances. When the k-mean algorithm is used, a prediction model may be built for each centroid that represents a clustered group. When an ANOVA process is used, historical data of the clustered group may be used to build a prediction model. In any case, if a larger dataset is needed to build a model, bootstrap sampling may be employed to increase the dataset.

Figure 5:
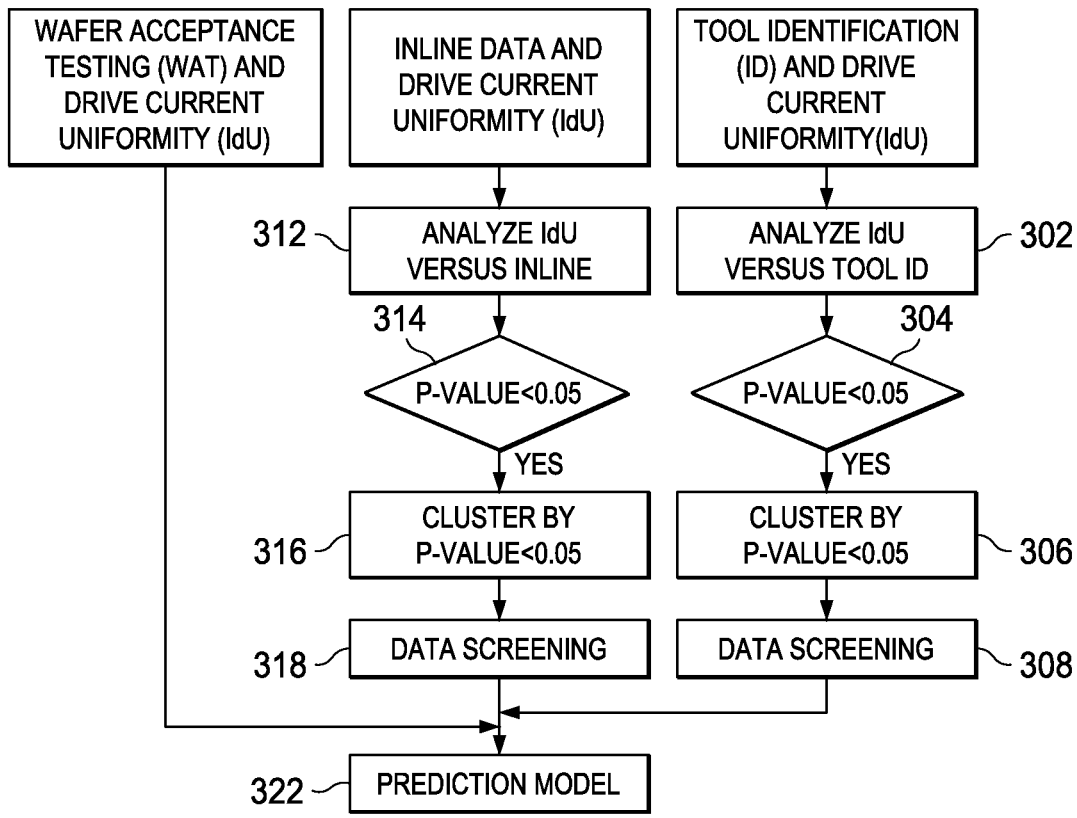
FIG. 5 is a process to cluster tools and to build a prediction model in accordance with an embodiment of the present invention.

FIG. 5 illustrates an example of an embodiment of the process to cluster tools using an ANOVA process and to build a prediction model. First, in step 302 the tool IDs and IdU values for the respective tool IDs are analyzed to find a p-value using an F-distribution test. The F-distribution test first identifies the standard deviation of the processing of each tool at each stage and ranks the tools within the stage. The tools are initially divided into two groups, and the groups are analyzed to determine a p-value. All possible combinations of two groups are analyzed to determine a p-value. In step 304, the combination of two groups that results in a p-value less than a threshold value, such as 0.05, and which is minimized in comparison to the other combinations forms an initial cluster. If so, then the tools having a p-value less than the threshold are clustered together in step 306. Tools that do not have a p-value less than the threshold are not clustered and are irrelevant to the modeling of the tools that are clustered together. Steps 304 and 306 may be repeated to further divide each of the two groups into further subgroups to create as many clusters as desired.

Further, in step 312 inline data from routes and IdU values for the respective inline data are analyzed to determine a p-value. In step 314, a determination is made whether the respective p-values of the inline data are less than a threshold value, such as 0.05. If so, then the tools with inline data having a p-value less than the threshold are clustered together in step 316. This clustering is also done by similar processes as discussed above. Data is then screened from both the tool and the inline data in steps 308 and 318, respectively. The screened data from steps 308 and 318, along with the wafer acceptance test (WAT) results for the IdU, are then used to build a prediction model that is a function of the inline data and the tool ID in step 322.

Some advantages of these embodiments are that fewer models are utilized in processing control, thus reducing complexity in the processing system. Also, because the prediction models are reduced, virtual WAT (VWAT) may be feasible. Further, the inventors have observed a reduction in root mean square error (RMSE) of trench depth etching when utilizing an embodiment of the present invention. For example, the RMSE of the trench depth etching was reduced from 31.0 Angstroms to 16.6 Angstroms.

Referring back to FIG. 2, cluster routes between the tool clusters of the three stages are illustrated. A person having ordinary skill in the art will realize that six cluster routes are illustrated, or in other words, six routes are available in a three stage system when a first stage has two tool clusters, a second stage has three tool clusters, and a third stage has one tool cluster (2×3×1=6). One example of a cluster route is when the wafers 2 are processed at the first stage tool cluster 50, are dispatched for processing at the second stage tool cluster 54, and are dispatched for processing at the third stage tool cluster 60. A second example is when the wafers 2 are processed at the first stage tool cluster 50, are dispatched for processing at the second stage tool cluster 56, and are dispatched for processing at the third stage tool cluster 60. A person having ordinary skill in the art will realize that the number of cluster routes is a function of the number of stages and tool clusters at each stage. For example, if a system has four stages and the first three stages have two clusters each and the fourth stage has three clusters, the number of cluster routes is twenty-four (2×2×2×3=24).

Within each cluster route are multiple dispatch routes. In FIG. 2, each cluster route comprises twelve dispatch routes. Note that a dispatch route is the actual route that a wafer may take from tool to tool during processing. A cluster route that comprises a tool cluster with multiple tools will have multiple dispatch routes because a wafer may be processed at a single stage by one of multiple tools, thus there are multiple dispatch routes. However, the cluster routes do not have to have equal number of dispatch routes. If the number of tools in different tool clusters at a stage differs between the tool clusters, the number of dispatch routes per cluster route will not be equal.

The cluster routes may be prioritized to aid dispatching to reduce wafer variation, although dispatching remains random in other embodiments. The cluster routes may be ranked such that a route that produces the least amount of variation is the best route with other routes subsequently ranked based on each route's variation. The best cluster route is assigned the highest priority with subsequently ranked routes ranked subsequently lower. Wafers for semiconductor devices requiring high uniformity and low variation may be dispatched along the best cluster route. Such semiconductor devices include video or graphic chips. Also, wafers for devices that do not require high uniformity may be dispatched along lower priority cluster routes.

Lots of wafers may be scheduled for dispatch to enable processing along particular cluster routes. A processing unit, such as a computer, operating with appropriate software, database, script, or the like may function as a scheduling tool. Such scheduling would generally require considerations of availability of tools in particular clusters at each stage. However, embodiments do not differentiate between tools within a single cluster such that dispatching within the cluster route remains random. Alternatively, other embodiments contemplate a tiered approach to dispatching wafers such that priority may be given to particular individual dispatch routes within a cluster route, although such a tiered approach may require increased complexity for scheduling, clustering, and modeling.

Figure 6:
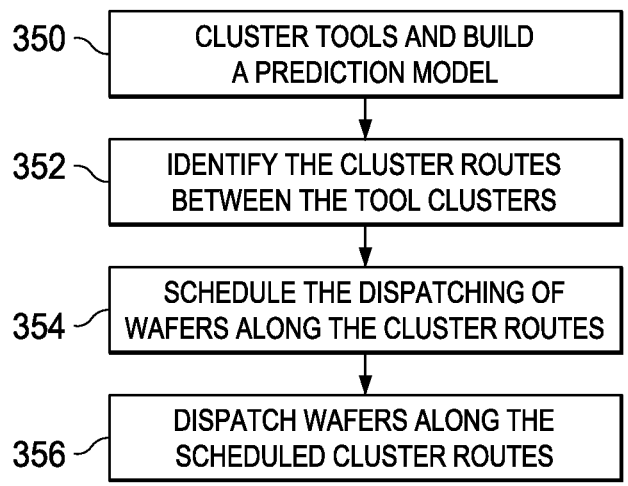
FIG. 6 is a flow chart of a process in accordance with an embodiment of the invention.

FIG. 6 is a simplified flow chart representing embodiments of the invention. At step 350, the processing tools at a processing stage are clustered according to defined parameters. The clustering may be accomplished through use of a k-mean algorithm, an ANOVA, a c-clustering algorithm, a top-down or bottom-up tree methodology, or the like. The clustering algorithms may use processing data as a basis to cluster the tools, such as inline data like metrology results, realtime processing tool sensor data, tool ID, WAT results, and the like. Examples of defined parameters may include a defined variance when a k-mean algorithm is used or a threshold value of a p-value, such as 0.05 or 0.01, when an ANOVA is used. The clustering of process tools may occur at one processing stage or multiple processing stages. A model or multiple models may then be built based on a cluster. Bootstrap sampling may be used to increase a data sample when building a model. The model may be for processing at a single stage or for processing across multiple stages, such as to realize VWAT. A processing unit, such as a computer operating with appropriate software, database, script, or the like may function as a clustering tool to run the algorithm and modeling process to cluster the tools and to form the model.

At step 352, the cluster routes are identified between the tool clusters. The cluster routes are a natural result of the clustering of the tools, such as what is illustrated in FIG. 2. Also while identifying the cluster routes, the cluster routes are ranked based on each route's ability to provide uniform processing results. The cluster routes may be ranked based on the amount of variance or standard deviation between processing data for each tool in each cluster at each stage. For example, the cluster route with the lowest variance or standard deviation may be the highest ranked cluster route to produce the highest uniformity, and the cluster route with the highest variance or standard deviation may be the lowest ranked cluster route with the lowest uniformity. A processing unit, such as a computer operating with appropriate software, database, script, or the like may function to determine the ranking of each cluster route, which may be done simultaneous to the clustering and/or modeling.

At step 354, the dispatching of wafers is scheduled along the cluster routes. Such scheduling may require considerations of tool availability. By scheduling the dispatch of wafers in such a manner, wafers that require high uniformity may be dispatched along a route that meets the high uniformity demands of the wafers. Likewise, wafers that do not require high uniformity may be dispatched along a cluster route that does not guarantee a high quality of uniformity, thus allowing for more flexibility and less costs in processing. A processing unit, such as a computer, operating with appropriate software, database, script, or the like may function as a scheduling tool. At step 356, wafers are dispatched along the cluster routes as scheduled in step 354. The processing proceeds in a manner that is well known in the art.

Figure 7:
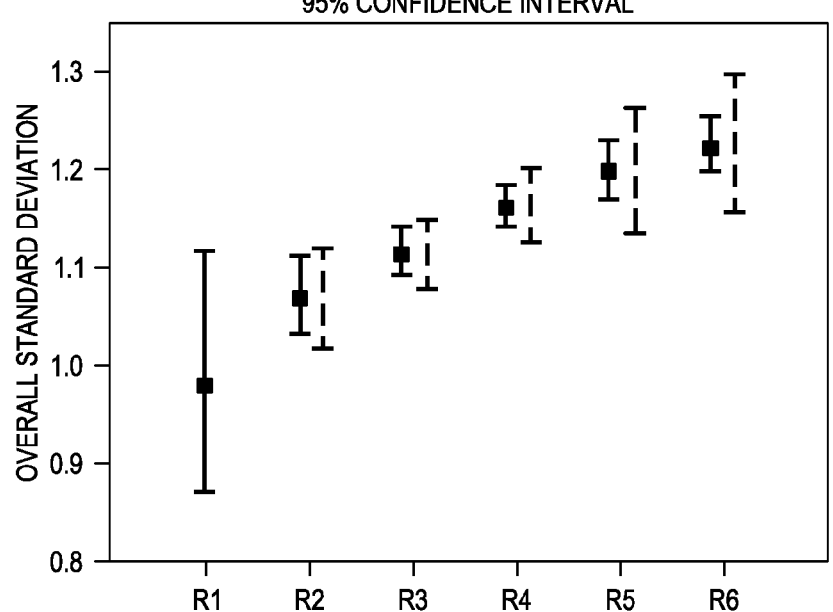
FIG. 7 is a graph illustrating the overall standard deviation range of the uniformity of WAT results for a previous month for the six best routes and the predicted range for the routes in a subsequent month.
Figure 8:
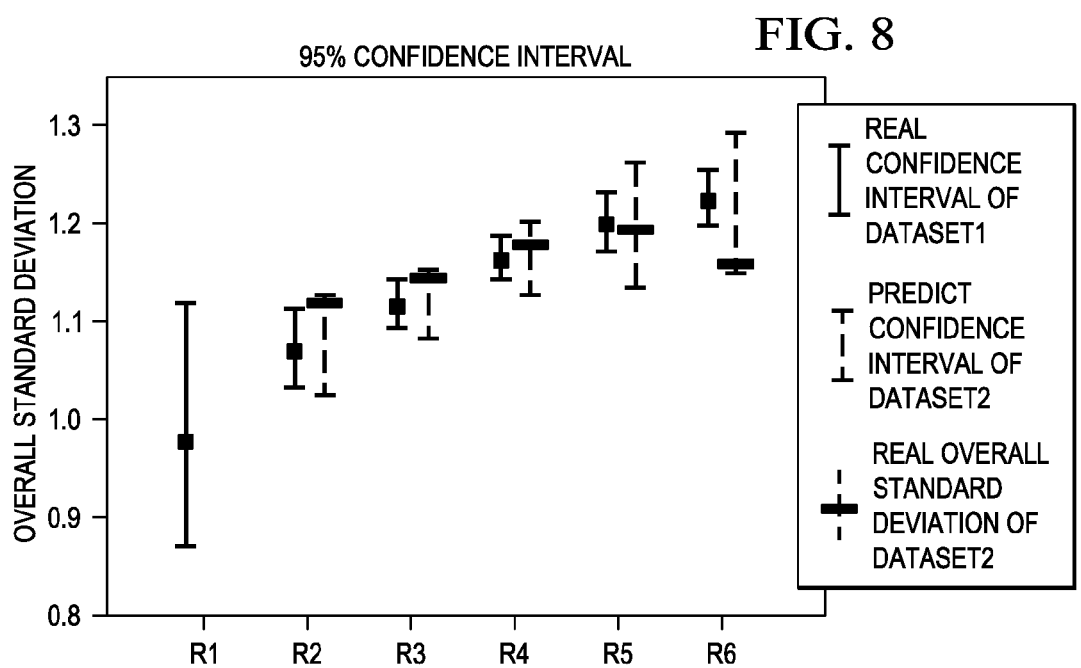
FIG. 8 is a graph illustrating the overall standard deviation range of the uniformity of WAT results for a previous month for the six best routes and the predicted range with the real results of the processing for the routes in a subsequent month.

FIGS. 7 through 10 illustrate aspects of the standard deviation of the uniformity of the wafer for an embodiment that creates six dispatch routes, such as what is illustrated in FIG. 2. FIG. 7 illustrates the overall standard deviation range of the uniformity of WAT results for a previous month for the six best routes and the predicted range for the routes in a subsequent month. The solid lines represent the ranges for the actual data for the previous month, whereas the dashed lines represent the ranges for the following month's prediction. In FIG. 8, the same chart as in FIG. 7 is shown along with the results of the processing of the subsequent month compared to the predicted results. The solid bar crossing the dashed lines is the actual result of the processing along each route. The actual results for each route are within the predicted ranges.

Figure 9:
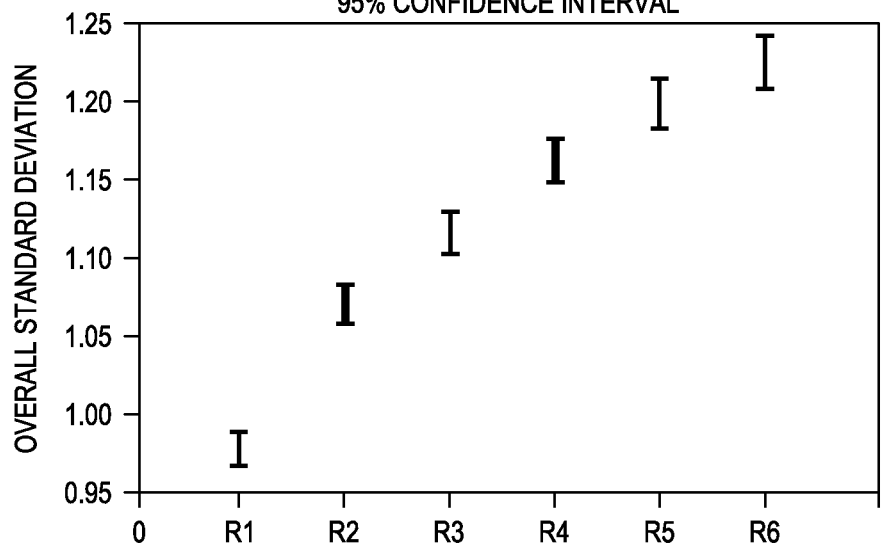
FIG. 9 is a graph illustrating the standard deviation ranges for the six cluster routes.
Figure 10:
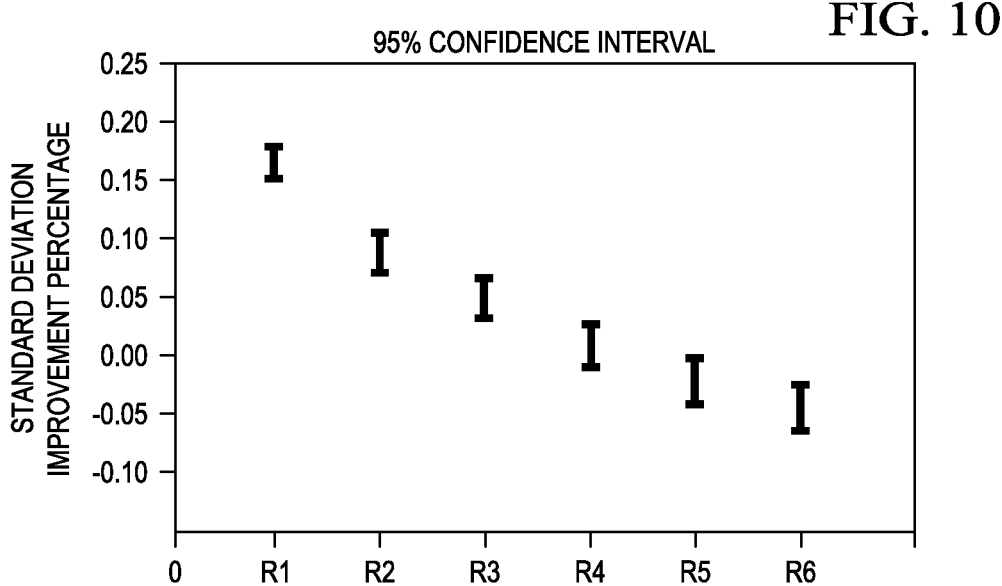
FIG. 10 is a graph illustrating the improvement in the standard deviation compared to known processes.

FIGS. 9 and 10 illustrate the standard deviation ranges for the six cluster routes for a separate dataset and the improvement in the standard deviation compared to known processes, respectively. In FIG. 9, cluster route one has a standard deviation range between 0.95 and 1.00. Each subsequent route has a range between higher standard deviation values. FIG. 10 shows the improvement of the standard deviation. For cluster route one, the wafer uniformity improved between 14 to 17 percent for one lot. For route two, the wafer uniformity improved between 6 to 10 percent for thirteen lots. For route three, the wafer uniformity improved between 3 to 6 percent for forty-one lots. For route four, the wafer uniformity improved between 1 to 2 percent for fifty-two lots. For route five, the wafer uniformity decreased between −4 to 0 percent for twenty-seven lots. For a dispatch to route six, the wafer uniformity decreased between −6 to −2 percent for thirty lots.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for semiconductor process control, the method comprising:
    using at least one processor:
        clustering processing tools of a processing stage into a tool cluster based on processing data; and
        forming a prediction model of a physical characteristic of a semiconductor wafer based on the tool cluster.

2. The method of claim 1, wherein the clustering includes using a k-mean algorithm.

3. The method of claim 2, wherein a fixed number of centroids are introduced into an n-dimensional space, wherein the n-dimensional space contains data-points representative of the processing tools and n is a number of parameters represented.

4. The method of claim 2, wherein a variable number of centroids are introduced into an n-dimensional space, wherein the n-dimensional space contains data-points representative of the processing tools and n is a number of parameters represented.

5. The method of claim 2, wherein the prediction model is based on a centroid of the tool cluster.

6. The method of claim 1, wherein the clustering includes using an analysis of variance (ANOVA).

7. The method of claim 6, wherein the tool cluster comprises the processing tools that have tool identifications (IDs), inline data, or wafer acceptance test (WAT) results that result in a p-value of less than 0.05 from the ANOVA.

8. The method of claim 1, wherein the clustering includes using a c-clustering algorithm or a top-down or bottom-up tree methodology.

9. The method of claim 1, wherein the clustering the processing tools of the processing stage into the tool cluster comprises clustering first processing stage tools of a first processing stage into first stage tool clusters, and clustering second processing stage tools of a second processing stage into second stage tool clusters.

10. The method of claim 9 further comprising:
    identifying cluster routes between each first stage tool cluster and each second stage tool cluster; and
    ranking each cluster route such that a rank assigned to each cluster route identifies an ability of each cluster route to optimize wafer processing uniformity comparatively with the other cluster routes.

11. The method of claim 10 further comprising scheduling processing of wafers, wherein some of the wafers that require high uniformity are processed on one of the cluster routes with a high rank representing a comparatively high optimization of wafer processing uniformity, and wherein others of the wafers that do not require high uniformity are processed on another of the cluster routes.

12. A method for semiconductor process control, the method comprising:
    providing cluster routes between first stage tool clusters and second stage tool clusters, wherein each cluster route is between one first stage tool cluster and one second stage tool cluster; and
    using at least one processor:
        assigning a comparative optimization ranking to each cluster route, wherein the comparative optimization ranking identifies comparatively which cluster routes provide for high wafer processing uniformity, and
        scheduling processing of wafers, wherein wafers that require high wafer processing uniformity are scheduled to be processed along one cluster route that has a high comparative optimization ranking that identifies the one cluster route to have a highest wafer processing uniformity, and wherein wafers that do not require high wafer processing uniformity are scheduled to be processed along another cluster route.

13. The method of claim 12 further comprising:
    dispatching the wafers that require high wafer processing uniformity along the one cluster route that has a high comparative optimization ranking; and
    dispatching the wafers that do not require high wafer processing uniformity along the other cluster route.

14. The method of claim 12, wherein the providing the cluster routes between the first stage tool clusters and the second stage tool clusters comprises clustering first stage processing tools into the first stage tool clusters, and clustering second stage processing tools into the second stage tool clusters.

15. The method of claim 14, wherein the clustering the first stage processing tools and the clustering the second stage processing tools each includes using a k-mean algorithm, an analysis of variance (ANOVA), a c-clustering algorithm, or a top-down or bottom-up tree methodology.

16. The method of claim 14, wherein the clustering the first stage processing tools and the clustering the second stage processing tools each includes clustering based on processing data.

17. A system for semiconductor wafer processing, the system comprising:
- first stage processing tools;
- second stage processing tools;
- a clustering tool to cluster the first stage processing tools into first stage tool clusters and to cluster the second stage processing tools into second stage tool clusters; and
- a scheduling tool to schedule wafer processing along cluster routes between the first stage tool clusters and the second stage tool clusters and based on a comparative ranking of the cluster routes, the comparative ranking being based on a characteristic of wafers processed by the respective cluster routes, wherein each cluster route is between one first stage tool cluster and one second stage tool cluster.

18. The system of claim 17, wherein the cluster routes are ranked comparatively based on wafer processing uniformity, and wherein the scheduling tool schedules a first group of wafers that requires high processing uniformity to be processed along one cluster route that has a ranking indicating a highest wafer processing uniformity.

19. The system of claim 17, wherein the clustering tool clusters the first stage tool clusters and the second stage tool clusters based on processing data using a k-mean algorithm, an analysis of variance (ANOVA), a c-clustering algorithm, or a top-down or bottom-up tree methodology.

20. The system of claim 19, wherein processing data includes chamber parameter data, tool identifications (IDs), inline data, or wafer acceptance test (WAT) results.

* * * * *